June 7, 1966  W. B. BEISEL, JR., ETAL  3,254,704
BOTTOM SUPPORTED AIR HEATER

Filed April 23, 1964  8 Sheets-Sheet 1

INVENTORS
Wilford B. Beisel, Jr.
Laszlo I. Dittert
Harold J. Dungey
Austin T. Fragomen
Herbert W. Hazen
BY
ATTORNEY

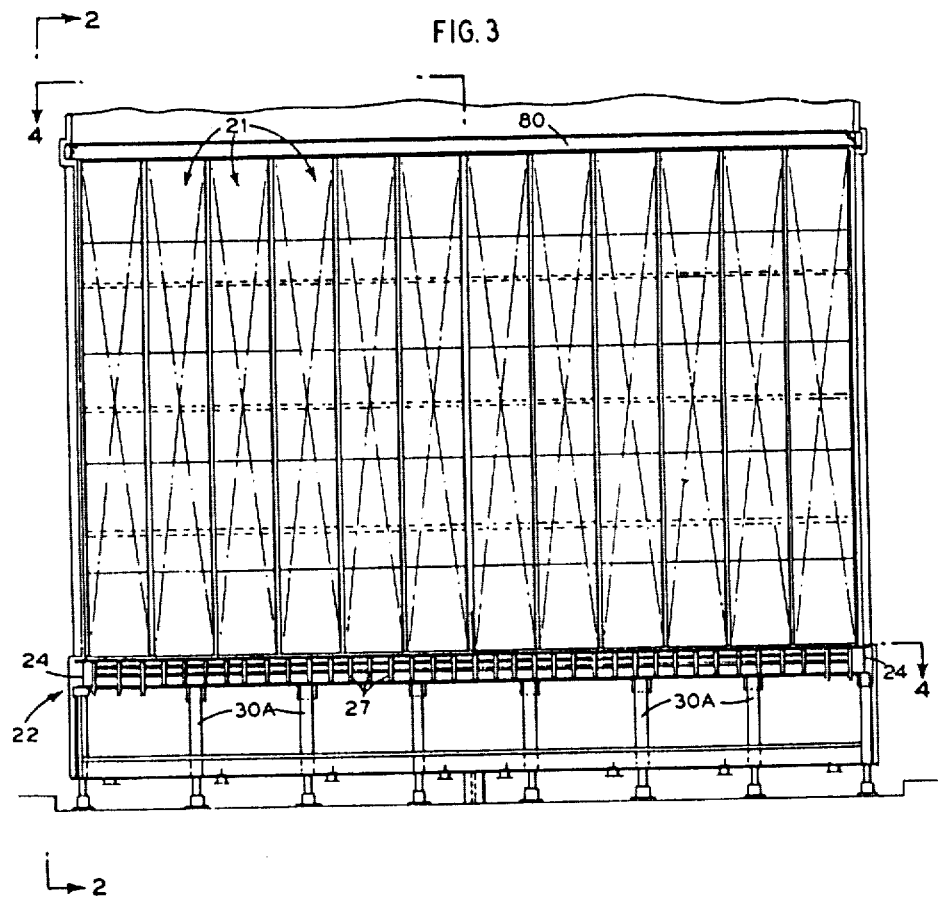

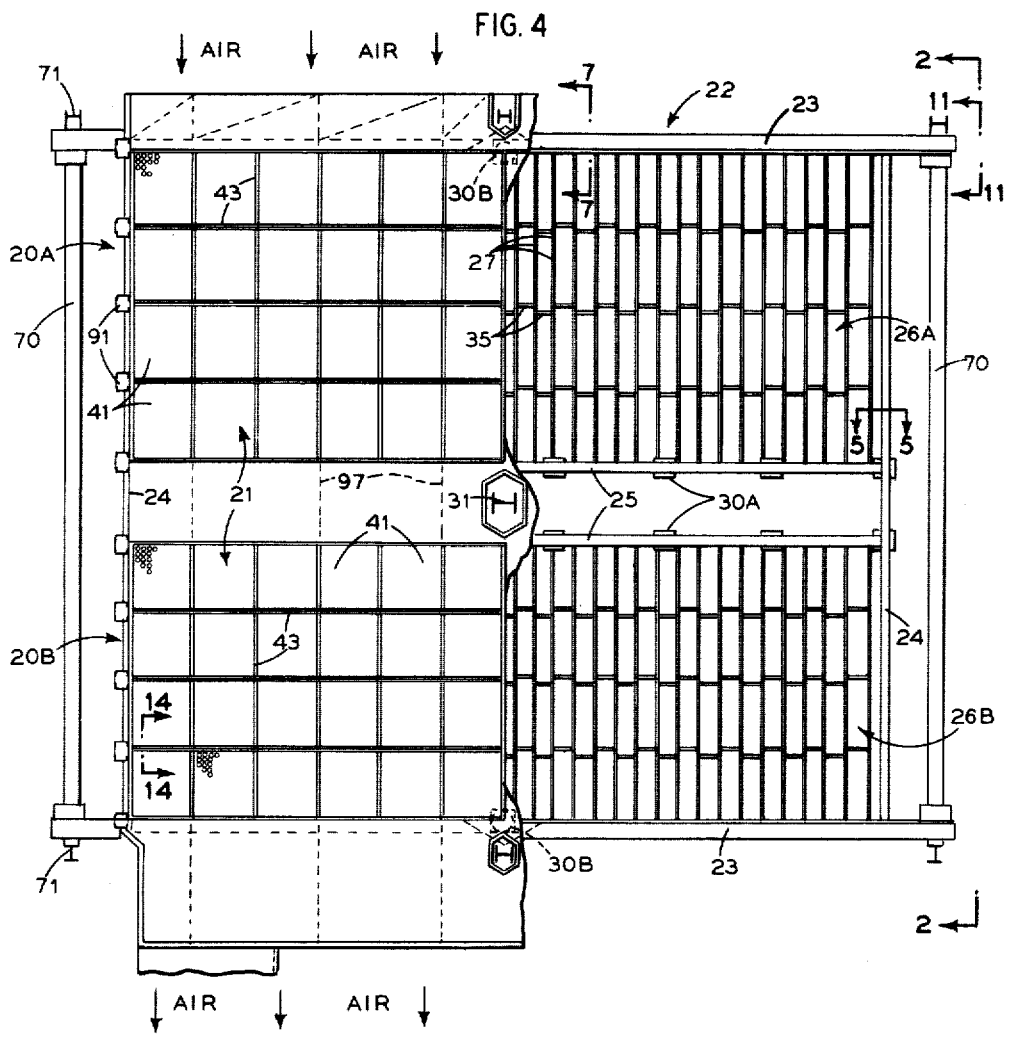

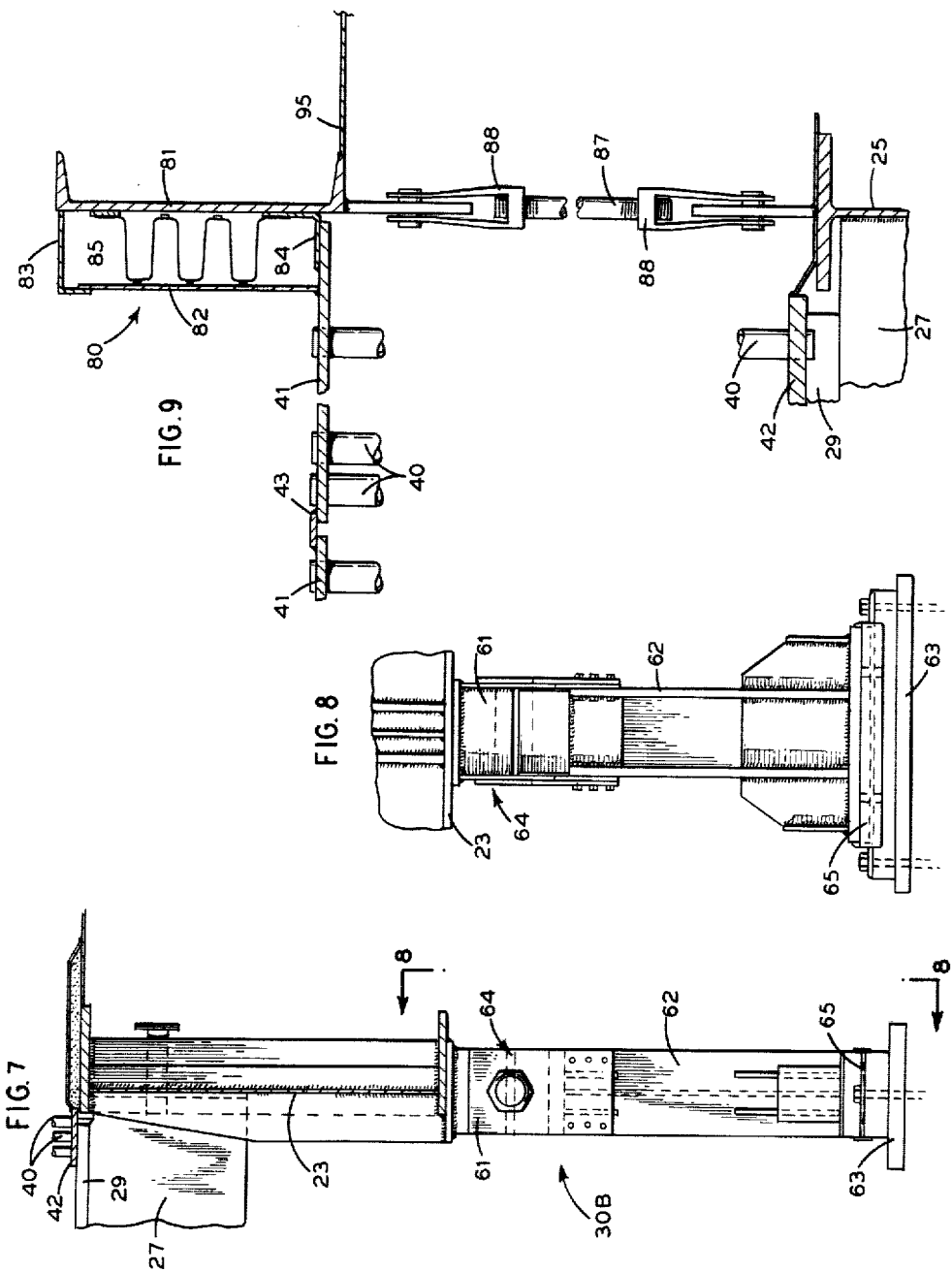

June 7, 1966 W. B. BEISEL, JR., ET AL 3,254,704
BOTTOM SUPPORTED AIR HEATER
Filed April 23, 1964 8 Sheets-Sheet 7

3,254,704
BOTTOM SUPPORTED AIR HEATER

Wilford Bertram Beisel, Jr., Barberton, Ohio, Laszlo Istvan Dittert, Pleasant Hill, Calif., and Harold James Dungey, Barberton, and Austin Thomas Fragomen, Canton, Ohio, and Herbert Wallace Hazen, Haddonfield, N.J., assignors to The Babcock & Wilcox Company, New York, N.Y., a corporation of New Jersey
Filed Apr. 23, 1964, Ser. No. 361,963
13 Claims. (Cl. 165—67)

This invention relates in general to the construction of an air heater of the type used in conjunction with a steam generator, and more particularly to a high capacity, stationary, bottom-supported, tubular air heater constructed of a plurality of cells or modules.

To effect maximum utilization of available heat, modern high capacity vapor generating units are usually equipped with air preheaters wherein incoming combustion air is heated by outgoing flue gases prior to their discharge to the stack. Air heaters for this use generally fall within two categories; the regenerative type, and the recuperative or stationary tubular type. With the advent of higher furnace chamber pressures associated with improved thermal efficiency and high capacity fuel burning equipment which requires a higher pressure drop, the air leakage problems in air heaters have become more acute. In these units, the pressure differential between gas side and air side in an air heater may approach 100 inches of water. For installations employing these high pressure differentials, the rotary regenerative type air heaters have been found to be inadequate in that they do not provide effective sealing between gas side and air side flow channels, with a consequent increase in fan power and dilution of outgoing flue gas with low temperature air which may cause or promote a corrosion condition in the colder portions of the air heater. As a result, the stationary tubular type air heater has found new favor for installations employing high gas-air pressure differentials due to the fact that it can be constructed with gas-tight seals. Nevertheless, the advantages of the stationary tubular air heater have been marginal because of its cumbersome size and consequent relatively high cost of fabrication and erection. A recent stationary tubular air heater for use in conjunction with a three million pound of steam per hour utility boiler utilizes over two million lineal feet of tubing, occupies a space of more than 125,000 cubic feet and weighs more than 2500 tons. Shop costs in fabricating the tube sheets are prohibitive for air heaters of this size; moreover, because of the restrictions on the size of components which can be shipped to the erection site, these large air heaters have had to be completely field assembled in the past. Furthermore, in instances where the air heater is top supported, which is the usual boiler practice for accommodating thermal expansion, the cost of structural support steel for these huge units has been a significant item. Additionally, as in all heat transfer units of such a large size, the accommodation of thermal expansion in multiple directions has been a constant problem.

It is therefore an object of the present invention to provide an air heater of the stationary tubular type, which can be shop-assembled into cells or modules, shipped to the erection site and there erected with relative ease. A further object of the present invention is to provide a bottom support structure and expansion system uniquely arranged to accommodate this modular air heater arrangement, while at the same time requiring a minimum of support steel.

To attain these objectives, the present invention embodies a bottom supported modular air heater comprising a pair of upright tubular heater sections so arranged as to afford a generally U-shaped flow path of gases through the heater sections in generally countercurrent flow relationship with respect to the single air pass which extends laterally with respect to the tubes of the heater sections. A rectangular support assembly underlies the heater sections and includes a pair of support grids, each of which comprises a rectangular frame and a plurality of spaced parallel grid bars extending between opposite sides of the frame and arranged to carry substantially all of the weight of the respective heater section. Each heater section is made up of a plurality of heater cells or modules, each of which consists of a pair of parallel rectangular tube sheets drilled to accommodate a multiplicity of spaced straight parallel tubes which extend between and project into the tube sheets and are rigidly connected thereto to form a rectangular prism-like structure. The heater modules are so arranged in each section so that each module is bounded on at least two of its sides by other modules, the tube sheets of adjacent modules being joined together by sealing strips. The parallel grid bars are arranged relative to the modules so that at least two grid bars underlie each module on opposite sides of the center of gravity thereof. The top tube sheets of adjacent heater sections are interconnected by means of sealing strips. The boundary modules are also connected to an expansion joint which extends around the upper perimeter of each heater section and accommodates vertical thermal expansion of the respective heater section. Provision is made for horizontal expansion of the air heater in radial directions from approximately the center of the air heater by a plurality of unidirectionally hinged support posts which are connected to the support assembly and are disposed substantially along the center lines thereof.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Of the drawings:

FIG. 3 is a sectional end view of the inventive air heater taken along line 3—3 of FIG. 2;

FIG. 4 is a plan view partly in section of the inventive air heater taken along line 4—4 of FIG. 3;

FIG. 7 is a view of a transversely movable pinned post support (relative to the support shown in FIG. 5) taken along line 7—7 of FIG. 4;

FIG. 8 is a view taken along line 8—8 of FIG. 7;

FIG. 9 is an enlarged view of the tie arrangement for the upper and lower tube sheets and the upper expansion joint as shown in FIG. 2;

Figure 1:
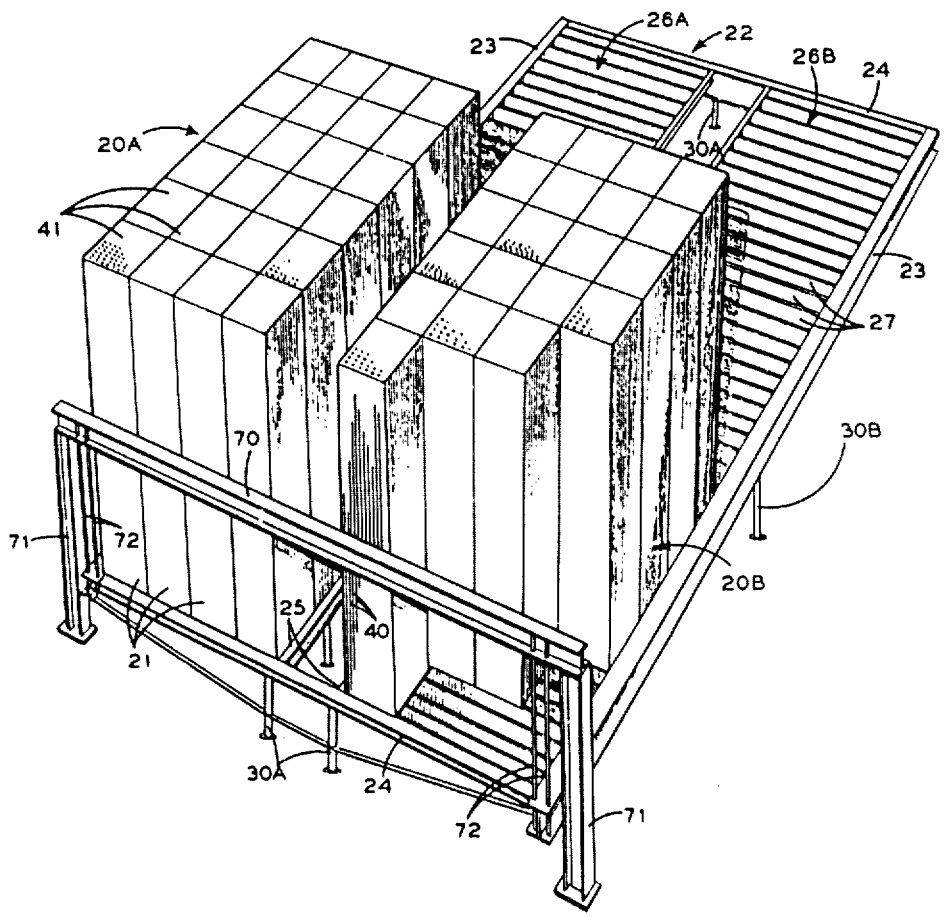
FIG. 1 is a schematic isometric view of a partially assembled modular air heater of the type disclosed herein.
Figure 2:
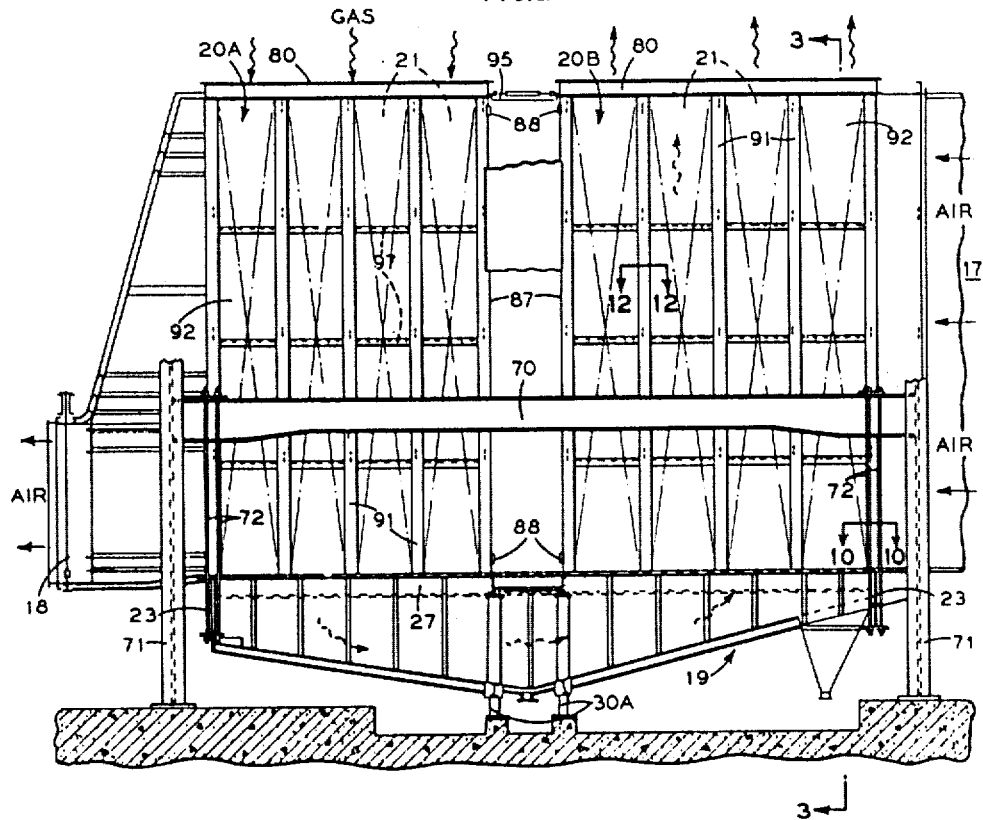
FIG. 2 is a side view of the inventive air heater taken along lines 2—2 of FIGS. 3 and 4.

Referring to FIGS. 1 and 2, the modular air heater includes a pair of upright heater sections 20A and 20B, each of which is made up of a plurality of upright substantially similar heater cells or modules 21. The heater cells comprise a multiplicity of parallel rows of upright tubes 40, through which pass the heating gas from an associated vapor generator (not shown) or other similar equipment. As best shown in FIG. 2, the heating gas passes downwardly through the tubes 40 of the heater section 20A, makes a U-shaped turn in the gas tight hopper 19 which underlies the heater sections 20A and 20B, and then flows upwardly through the tubes 40 of the heater section 20B to an exhaust duct (not shown). The air (or the gaseous fluid to be heated) flows laterally into the air inlet 17 through the heater in a generally counter flow heat transfer relationship to the heating gas, passing over and around the outside of the tubes 40, flowing first through heater section 20B and then through section 20A to an air outlet 18 which carries the heated air to the burners of the vapor generating unit (not shown) or other point of use.

As best shown in FIG. 1, each heater section 20A and 20B is made up of a plurality of upright substantially similar heater cells or modules 21 arranged in side-by-side relation, each module 21 being bounded on at least two of its sides by other substantially similar modules 21. Each module 21 includes a horizontally disposed rectangular top tube sheet 41 suitably drilled to receive the upper ends of the tubes 40 which form an integral part of the module 21, and a bottom tube sheet 42, in spaced parallel relationship and similarly drilled to receive the lower ends of the tubes 40. The tubes 40 are securely connected to the tube sheets 41 and 42 as by rolling or welding, so that the openings in the tube sheets 41 and 42 are in leak-tight communication with the upper and lower open ends of the tubes 40. Adjacent top tube sheets 41 are connected by metallic sealing strips 43 (see FIGS. 4 and 9). Similarly disposed sealing strips (not shown) interconnect and seal adjacent bottom tube sheets 42. It should be noted that the primary function of the sealing strips 43 is to seal adjacent top tube sheets 41 (and bottom tube sheets 42) to preclude leakage between the heating gas and heated gas flow channels.

To facilitate fabrication and minimize cost of the air heater, the modules 21 are shop fabricated for field erection. As the modules are placed in position during erection the sealing strips 43 are welded to the tube sheets 41 and 42, as shown in FIG. 9, to maintain the modules in their proper relative positions. By way of description and not limitation, the assignee of the present invention has designed an air heater having a plurality of modules 21 which weigh approximately 30 tons each. The top and bottom tube sheets 41 and 42 of these modules 21 are about 7 feet square and each module 21 has approximately 720 tubes 40, each tube 40 being about two inches in diameter and 40 feet long. Thus it can be seen that by shop assembling the modules and then erecting the air heater using the modular concept discussed above, a considerable saving in time and cost can be achieved.

Referring to FIGS. 1, 2, 3 and 4, the heater sections 20A and 20B are supported by an integrated bottom support assembly 22 which underlies both sections. The support assembly 22 comprises a pair of laterally extending spaced, parallel, shear-center girders 23 and a pair of transversely extending, spaced, parallel I-beams 24, the girders 23 and I-beams 24 cooperating to form a rectangular frame of steelwork defining the outer boundaries of the support assembly 22. A pair of spaced, parallel, laterally extending central I-beams 25, secured between I-beams 24 by plates 28 (see FIG. 5) divide the support assembly into a pair of rectangular grid sections 26A and 26B which respectively underlie and support the heater sections 20A and 20B. Each of the grid sections 26A and 26B includes a plurality of spaced, parallel grid bars 27 which extend parallel to the I-beams 24 and connect between the central I-beams 25 and the girders 23. The grid bars 27 carry substantially all of the weight of the heater modules 21, and (as shown in FIG. 3) the depth of the grid bars 27 varies across the width of the air heater according to the calculated load to be carried by each individual bar 27. Bearing bars 29 (see FIGS. 5, 7 and 9) are provided between the load bearing grid bars 27 and the bottom tube sheets 42 to serve as spacers between the tube sheets 42 and the grid bars 27 because the tube spacing is too close to allow the grid bars 27 to fit between tubes 40. Although the bearing bars 29 are shown as being parallel to the grid bars 27, it should be recognized that the bearing bars merely transmit the weight of the modules to the grid bars 27 and could readily be arranged perpendicular to the grid bars 27 with the same result. Because of the length of the grid bars 27 and their relatively small section modulus, spaced lateral spacer pipes 35 (see FIGS. 4 and 5) are provided between adjacent bars 27 as necessary to prevent lateral deflection of the bars 27. The spacer pipes 35 are provided in pairs, one being disposed above the other, to preclude twisting of the grid bars 27.

It should be noted in FIG. 3 that each heater module 21 rests directly on three bearing bars 29, and therefore on three grid bars 27, in the embodiment shown. For purposes of the present invention it is essential that each module 21 be supported by at least two members (bearing bars 29) located on opposite sides of the center of gravity of the module 21, to provide adequate stability and support. By thus providing individual support for each module, there is a minimum of stress placed on the sealing strips 43 which interconnect contiguous top tube sheets 41 and contiguous bottom tube sheets 42.

The entire bottom support assembly 22 is supported by a plurality of hinged posts 30A and 30B which rest on suitable foundations and are arranged generally along the horizontal centerlines of the air heater beneath girders 23 and the central I-beams 25 (see FIGS. 1 and 4). Thus there are two parallel spaced rows of posts 30A extending along opposite sides of the lateral centerline of the air heater, and a pair of posts 30B positioned at the forward and rearward ends of the transverse centerline. Since the air heater is anchored at approximately its center by column 31, the posts 30A and 30B are constructed and arranged to pivot outwardly, i.e., radially from the center column 31 to thereby accommodate horizontal differential thermal expansion of the air heater. Expansion of the air heater between the rows of posts 30A in the transverse direction of these rows is small enough so that it can be ignored.

Figure 5:
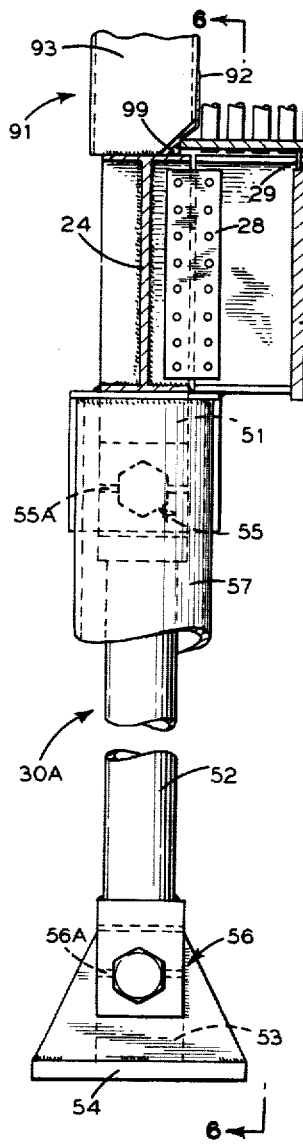
FIG. 5 is a view of a laterally movable pinned post support taken along line 5—5 of FIG. 4.
Figure 6:
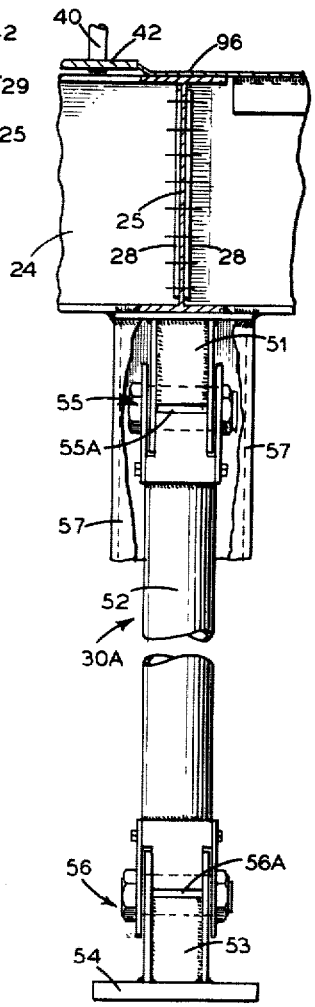
FIG. 6 is a view taken along line 6—6 of FIG. 5.

The posts 30A, shown in detail in FIGS. 5 and 6, are welded to and support the central I-beams 25. The post 30A includes three load bearing shaft members, i.e., an upper shaft portion 51, an elongated intermediate shaft portion 52, and a lower shaft portion 53. The upper shaft portion 51 is rigidly connected at its upper end to the bottom of the I-beam 25, while the lower shaft portion 53 is connected to a base plate 54 which rests on a suitable foundation. An upper hinge-pin assembly 55 is provided between the upper and intermediate shaft portions 51 and 52 respectively, and a lower hinge-pin assembly 56 interconnects the intermediate and lower shaft portions 52 and 53 respectively, so that the post 30A can accommodate limited lateral movements of the I-beam 25, the limit of movement being determined by the clearance dimension of the spaces 55A and 56A between the lower end of the upper shaft portion 51 and the upper end of the intermediate shaft portion 52, and between the lower end of the intermediate shaft portion 52 and the upper end of the lower shaft portion 53 respectively. The change in height of the post 30 corersponding with the maximum lateral deflection is small enough so that it can be ignored. A cylindrical cover or pipe 57 suitably encloses the entire post 30A to prevent dust and moisture from entering the hinge-pin assemblies 55 and 56.

Posts 30B, the details of which are shown in FIGS. 7 and 8, are connected to the underside of each of the girders 23 at the mid-point of the span. Each post 30B includes an upper column portion 61, an elongated central column portion 62, and a lower base portion 63. An upper hinge-pin assembly 64 (similar to the hinge-pin assemblies 55A and 55B of posts 30A) interconnects the upper and intermediate column portions 61 and 62. The lower end of the intermediate column portion 62 and the upper surface of the base portion 63 are formed respectively with mating convex and concave surfaces which engage to form a sliding joint 65. Thus, post 30B, like post 30A, is provided with a pair of joints which allow limited horizontal movement of the girder 23.

Figure 10:
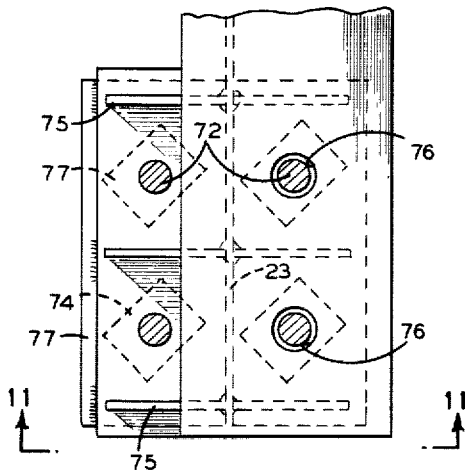
FIG. 10 is a sectional plan view of the air heater corner hanger support taken along line 10—10 of FIG. 2.
Figure 11:
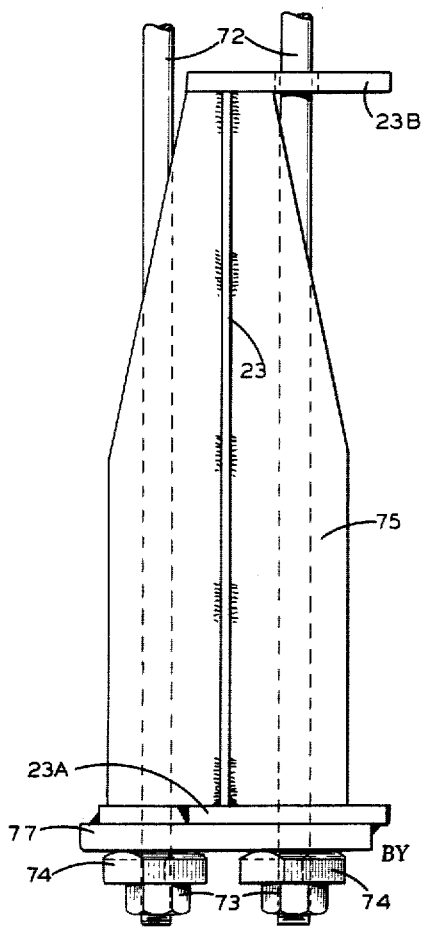
FIG. 11 is a view of the corner hanger support taken along lines 11—11 of FIGS. 4 and 10.

From FIGS. 1 and 2, it should be noted that the corners of the bottom support assembly 22 are not provided with support posts connected directly to the foundations. Since the expansion of the air heater is generally radial with respect to the center column 31, the horizontal movement of the air heater corners during expansion would result in a diagonal movement embodying both lateral and transverse components. To accommodate this two-way motion, the corners of the air heater are suspendedly supported from the span girders 70 which extend along the sides of the air heater and are supported by corner columns 71. Each end of the girder 23 is suitably connected to a span girder 70 by four rods 72 (see FIGS. 2, 10 and 11) which are of sufficient length and strength so that expansion of the corners of the bottom support assembly 22 is accommodated by flexing of the rods 72. As shown in FIGS. 10 and 11, the lower ends of the rods 72 are threaded and provided with nuts 73 which engage the reinforcing pad 77 which is welded to the underside of the lower flange 23A of the girder 23. Rectangular rocking washers 74 are provided between the nuts 73 and the reinforcing pad 77. It should be noted that the curved surface of the rocking washers 74 is aligned so that the rocking movement will be accommodated in a direction generally diagonal of the air heater. Reinforcing webs 75 are provided on the girder 23 to strengthen it at the location where the rods 72 connect with the girder 23. The upper flange 23B of the girder 23 is provided with openings 76 through which pass two of the rods 72. The connection of the rods 76 to the span girder 70 is accomplished in a manner similar to that shown in FIG. 11 for the girder 23.

Figure 16:
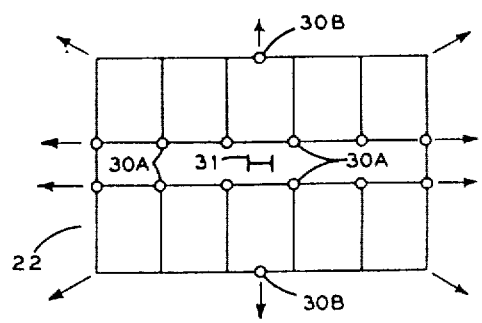
FIG. 16 is a schematic plan view of the bottom support assembly showing the directions of expansion of said assembly.

From the above and referring to FIG. 16, it can be seen that the thermal expansion of the bottom support assembly 22 in horizontal direction emanates radially from the center column 31 as shown by the arrows in FIG. 16. Expansion in the lateral direction is accommodated by hinged-pin posts 30A disposed generally along the lateral centerline of the air heater, expansion in the transverse direction is accommodated by posts 30B located on the transverse centerline of the air heater, and expansion of the corners of the support system 22 is taken up by flexing of the rods 72 on which the corners are "hung" from external steelwork (corner column 71 and span girders 70). In conjunction with the expansion of the bottom support assembly 22, it should be noted that the entire assembly 22 is in communication with the heating gases; therefore, expansion of the assembly 22 is substantially the same as the expansion of the modules 21 and no provisions are necessary to accommodate relative expansion therebetween.

Vertical expansion of the heater modules 21 is accommodated by a pair of expansion joints 80 (seen FIGS. 2 and 9) which are provided around the perimeters of the gas inlet and outlet of the air heater above each of the heater sections 20A and 21. As shown in FIG. 9, the expansion joint 80 includes an outwardly facing channel 81 having its lower end adjacent to the top tube sheet 41. A vertically disposed plate shield 82 is welded to the tube sheet 41 and is slidably engaged with the downwardly extending leg of the angle 83 which is attached to the top of channel 81. An angle 84 is welded to the tube sheet 41 and has the outer surface of its upwardly extending leg in sliding engagement with the inner surface of the channel 81. A flexible bellows member 85, having a plurality of accordion-type folds, is connected at its upper end to the channel 81 and at its lower end to the upstanding leg of angle 84. Thus, it can be seen that the inherent flexibility of the bellows member 85 of the expansion joint 80 allows vertical movement of the tube sheet 41 relative to the channel 81 to accommodate vertical expansion of the heater modules 21. The sliding engagements between the plate 82 and the angle 83 and between the angle 84 and the channel 81 provide a reasonable tight seal to prevent dirt from getting into the expansion joint assembly 80.

Figure 13:
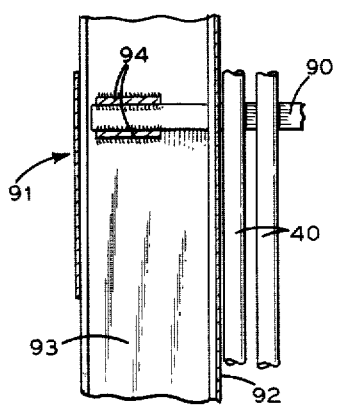
FIG. 13 is a sectional view taken along line 13—13 of FIG. 12.
Figure 14:
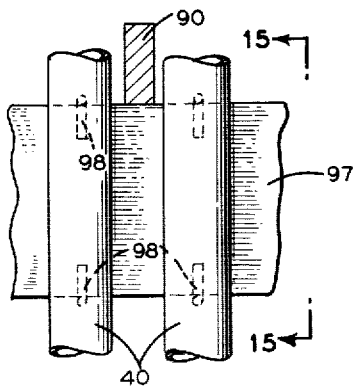
FIG. 14 is an enlarged partial sectional view of the internal tie bars taken along line 14—14 of FIG. 4.
Figure 12:
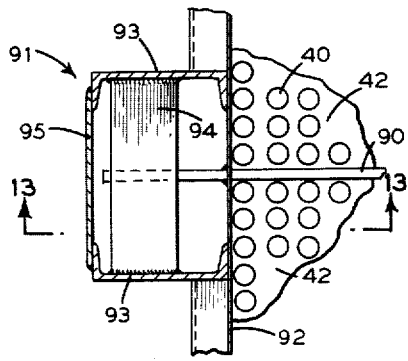
FIG. 12 is an enlarged sectional plan view of a lateral internal tie bar end taken along line 12—12 of FIG. 2.
Figure 15:
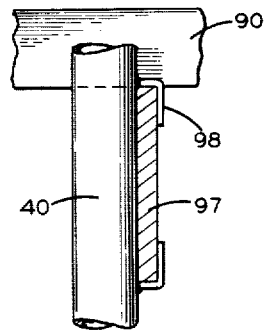
FIG. 15 is a sectional view taken along line 15—15 of FIG. 14.

In air heaters of the type disclosed herein, it is common that the static pressure in the air side flow channel approaches 100 inches of water pressure. The usual method of reinforcing the outer casing is to use a system of encircling external buckstays. However, in very large installations, a buckstay system of this type is extremely costly because of the large quantities of steel required. To avoid the high cost of an external buckstay system, the air heater herein disclosed utilizes an internal tie system to reinforce the casing and to counteract the effect of the pressure imposed on the tube sheets and casing. The internal tie system consists of three types of ties, all running in perpendicular directions to each other. The first type is the vertical tie rods 87 (see FIG. 9) which interconnect the channels 81 at the top of the heater sections 20A and 20B with the central I-beams 25 and the girders 23. Turnbuckles 88 are provided so that the tension loading on the tie rods 87 can be properly adjusted. The second type of internal tie comprises laterally extending casing ties 90 extending between end tie assemblies 91 which are vertically disposed on the outside of the casing 92 as shown in FIGS. 2, 12 and 13. The end tie assemblies include a pair of vertically extending spaced, parallel channels 93 having their legs facing each other, and having pairs of spaced tie plates 94 welded therebetween. The casing ties 90 pass through the side casing 92 and are welded securely to the tie plates 94. A cover plate 95 is welded between the outer legs of the channels 93 to reinforce and seal off the end tie assembly 91. The third type of internal tie includes transversely extending tie bars 97 extending between and suitably connected to a system of trusses (not shown) located in the air inlet and outlet ducts of the air heater. As shown in FIGS. 14 and 15, metallic clips 98 hold the tie bars 97 in engagement with the tubes 40.

The above described second and third types of internal ties, i.e., laterally extending casing ties 90 and transversely extending tie bars 97, are preferably installed within each of the modules 21 as the air heater is being erected, thus eliminating the necessity of threading the long internal tie bars 90 and 97 through the air heater when it is completed. The internal tie system as described thus provides adequate strengthening of the air heater side casing 92 to counteract the force created by the static pressure on the air side of the heater, and at the same time eliminates the necessity of a bulky and costly system of external buckstays.

The air flow side of the air heater is completely isolated from the heating gas flow channels to preclude leakage of air into the heating gas. The top and the bottom tube sheets 41 and 42 of adjacent modules 21 are joined by sealing strips 43 to render them impervious to gas leakage. The expansion joints 80 around the upper perimeter of the heater sections 20A and 20B provide leak-tight seals between the top (floating) tube sheets 41 and the stationary structural framework formed by channels 81. Top casing 95, extending between the adjacent channels 81 of heater sections 20A and 20B (see FIGS. 2 and 9), complete the sealing of the top of the air heater. The side casing 92 is attached to the channels 81 at the top of the air heater. As shown in FIG. 5, the side casing is attached to the outer edges of lower tube sheets 42, and sealing bars 99 are welded between the top flanges of the I-beams 24 and the outer edges of the lower tube sheets 42. In this respect, it should be noted that the bottom tube sheets 42 are stationary relative to the entire bottom support system 22 of which I-beams 24 are a part. Bottom casing 96 disposed between heater sections 20A and 20B is welded between adjacent edges of the lower tube sheets 42 as shown in FIG. 6. From the above description it can be seen that the various sealing devices, in combination with the casing, completely isolate the gas and air sides of the heater from each other and additionally prevent leakage of air from the air heater to the atmosphere.

In summation, the disclosed construction provides an air heater of the stationary tubular type which can be partially shop pre-assembled into cells or modules 21 and shipped to the erection site where it can be erected with a considerable saving in time and cost as compared to the usual type of completely field erected air heaters. The bottom support assembly 22 and associated expansion accommodating support posts further reduce costs in that a minimum amount of structural steel is required since the main support columns are relatively short. The internal tie system also reduces the cost of the air heater since the need for an external buckstay system is thereby eliminated.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A bottom supported air heater for heating air comprising a heater section adapted for the flow of air therethrough and arranged for the indirect exchange of heat from a heating gas to the air, a rectangular bottom support assembly in communication with said heating gas and arranged to carry substantially all the weight of said heater section, and means for accommodating horizontal expansion of said bottom support assembly in substantially radial directions from approximately the center of said bottom support assembly comprising a plurality of pivotally arranged support posts connected to said support assembly and disposed substantially along the lateral and transverse centerlines thereof, rigid structural members disposed adjacent the corners of said support assembly, and flexible members connecting said corners with said structural members.

2. A bottom supported air heater for heating air comprising means forming a single laterally extending air flow passage, a pair of upright heater sections in side-by-side relation and arranged to effect a U-shaped flow path of heating gases through the air heater in heat exchange relation with said air, a horizontally disposed bottom support assembly in communication with said heating gases and comprising a pair of rectangular grid sections respectively underlying said heater sections and arranged to carry substantially all of the weight of said heater sections, and means for accommodating horizontal expansion of said bottom support assembly in substantially radial directions from approximately the center of said bottom support assembly comprising a plurality of pivotally arranged support posts connected to said support assembly and disposed substantially along the lateral and transverse centerlines thereof, structural members disposed above the corners of said support assembly, and flexible hanger rods suspendedly supporting said corners from said structural members.

3. A bottom supported air heater for heating air comprising means forming a single laterally extending air flow passage, a pair of upright heater sections in side-by-side relation and arranged to effect a U-shaped flow path of heating gases through the air heater in heat exchange relation with said air, a bottom support assembly in communication with said heating gases and comprising a pair of rectangular grid sections respectively underlying said heater sections and arranged to carry substantially all of the weight of said heater sections, fixed upright column means located at approximately the center of said air heater, means anchoring said bottom support assembly to said column means, and means for accommodating horizontal expansion of said bottom support assembly in substantially radial directions from said column means.

4. A bottom supported air heater for heating air comprising means forming a single laterally extending air flow passage, a pair of upright heater sections in side-by-side relation and arranged to effect a U-shaped flow path of heating gases through the air heater in heat exchange relation with said air, a bottom support assembly in communication with said heating gases and comprising a pair of rectangular grid sections respectively underlying said heater sections and arranged to carry substantially all of the weight of said heater sections, fixed upright column means located at approximately the center of said air heater, means anchoring said bottom support assembly to said column means, and means for accommodating horizontal expansion of said bottom support assembly in substantially radial directions from said column means, said last named means comprising a plurality of unidirectionally pivotally arranged support posts connected to said support assembly and disposed substantially along the lateral and transverse centerlines thereof, structural members disposed above the corners of said support assembly, and flexible hanger rods suspendedly supporting said corners from said structural members.

5. A bottom supported air heater for heating air comprising a heater section adapted for the flow of air therethrough and arranged for the indirect exchange of heat from a heating gas to the air, said heater section comprising a plurality of upright heater cells, each heater cell including a multiplicity of upright tubular members rigidly connected together in fluid-tight relationship at their upper and lower ends, each heater cell being bounded on at least two of its sides by other heater cells, a rectangular grid section in communication with said heating gas and underlying and being arranged to carry substantially all the weight of said heater section, said grid section including a frame and a plurality of spaced load-bearing grid bars connected between opposite sides of said frame, said grid bars being arranged relative to said heater cells so that at least two of said grid bars underlie each of said heater cells on opposite sides of the center of gravity thereof to effect substantially independent support of each of said heater cells, and sealing means interconnecting the contiguous upper and lower edges of adjacent heater cells.

6. A bottom supported air heater for heating air comprising means forming a single laterally extending air flow passage, a pair of side-by-side upright heater sections arranged to effect a U-shaped flow path of heating gases through the air heater in heat exchange relation with said air, each of said heater sections comprising a plurality of upright heater cells, each heater cell including a rectangular upper tube sheet and a parallel lower tube sheet, and a multiplicity of tubular members rigidly connected to and extending between said upper and lower tube sheets, each heater cell being bounded on at least two of its sides by other heater cells, a bottom support assembly in communication with said heating gases and comprising a pair of rectangular grid sections respectively underlying said heater sections and arranged to carry substantially all the weight of said heater sections, each of said grid sections including a frame and a plurality of parallel spaced load-bearing grid bars connected between opposite sides of said frame, said grid bars being arranged relative to said heater cells so that at least two of said grid bars underlie each of said heater cells on opposite sides of the center of gravity thereof to effect substantially independent support of each of said heater cells, each of said cells being supported by but free of rigid attachment to its respective grid bars, and sealing means interconnecting the contiguous upper and lower tube sheets of adjacent heater cells.

7. A bottom supported air heater for heating air comprising a heater section adapted for the flow of air therethrough and arranged for the indirect exchange of heat from a heating gas to the air, said heater section comprising a plurality of upright heater cells, each heater cell including a rectangular upper tube sheet and a parallel lower tube sheet, and a multiplicity of tubular members rigidly connected to and extending between said upper and lower tube sheets, each heater cell being bounded on at least two of its sides by other heater cells, a bottom support assembly underlying said air heater and including a rectangular grid section in communication with said heating gas and underlying and being arranged to carry substantially all the weight of said heater section, said grid section including a frame and a plurality of spaced load-bearing grid bars connected between opposite sides of said frame, said grid bars being arranged relative to said heater cells so that at least two of said grid bars underlie each of said heater cells on opposite sides of the center of gravity thereof to effect substantially independent support of each of said heater cells, sealing means interconnecting the contiguous upper and lower tube sheets of adjacent heater cells, fixed upright column means located at approximately the center of said air heater, means anchoring said bottom support assembly to said column means, and means for accommodating horizontal expansion of said bottom support assembly in substantially radial directions from said column means.

8. A bottom supported air heater for heating air comprising means forming a single laterally extending air flow passage, a pair of side-by-side upright heater sections arranged to effect a U-shaped flow path of heating gases through the air heater in heat exchange relation with said air, each of said heater sections comprising a plurality of upright heater cells, each heater cell including a rectangular upper tube sheet and a parallel lower tube sheet, and a multiplicity of tubular members rigidly connected to and extending between said upper and lower tube sheets, each heater cell being bounded on at least two of its sides by other heater cells, a bottom support assembly in communication with said heating gases and comprising a pair of rectangular grid sections respectively underlying said heater sections and arranged to carry substantially all the weight of said heater sections, each of said grid sections including a frame and a plurality of parallel spaced load-bearing grid bars connected between opposite sides of said frame, said grid bars being arranged relative to said heater cells so that at least two of said grid bars underlie each of said heater cells on opposite sides of the center of gravity thereof to effect substantially independent support of each of said heater cells, sealing means interconnecting the contiguous upper and lower tube sheets of adjacent heater cells, and means for accommodating horizontal expansion of said bottom support assembly in substantially radial directions from approximately the center thereof comprising a plurality of pivotally arranged support posts connected to said support assembly and disposed substantially along the lateral and transverse centerlines thereof, rigid structural members disposed adjacent the corners of said support assembly, and flexible members connecting said corners with said structural members.

9. A bottom supported air heater for heating air comprising means forming a single laterally extending air flow passage, a pair of side-by-side upright heater sections arranged to effect a U-shaped flow path of heating gases through the air heater in heat exchange relation with said air, each of said heater sections comprising a plurality of upright heater cells, each heater cell including a rectangular upper tube sheet and a parallel lower tube sheet, and a multiplicity of tubular members rigidly connected to and extending between said upper and lower tube sheets, each heater cell being bounded on at least two of its sides by other heater cells, a bottom support assembly in communication with said heating gases and comprising a pair of rectangular grid sections respectively underlying said heater sections and arranged to carry substantially all the weight of said heater sections, each of said grid sections including a frame and a plurality of parallel spaced load-bearing grid bars connected between opposite sides of said frame, said grid bars being arranged relative to said heater cells so that at least two of said grid bars underlie each of said heater cells on opposite sides of the center of gravity thereof to effect substantially independent support of each of said heater cells, sealing means interconnecting the contiguous upper and lower tube sheets of adjacent heater cells, fixed upright column means located at approximately the center of said air heater, means anchoring said bottom support assembly to said column means, and means for accommodating horizontal expansion of said bottom support assembly in substantially radial directions from said column means, said last named means comprising a plurality of unidirectionally pivotally arranged support posts connected to said support assembly and disposed substantially along the lateral and transverse centerlines thereof, structural members disposed above the corners of said support assembly, and flexible hanger rods suspendedly supporting said corners from said structural members.

10. A bottom supported air heater comprising a pair of side-by-side heater sections, each including a multiplicity of upright tubes, means for effecting a U-shaped flow path of heating gas downwardly through the tubes of one of said heater sections and upwardly through the tubes of the other of said heater sections, each of said heater sections comprising a plurality of heater cells, each heater cell having a substantially rectangular horizontal cross section and including a multiplicity of said tubes rigidly connected together in fluid-tight relationship at their upper and lower ends, sealing means interconnecting the contiguous upper and lower edges of adjacent heater cells, side casing cooperating with the upper and lower ends of said cells to form a single laterally extending pressurized air flow passage through which air is passed over the tubes of both of said heater sections, said passage having an air inlet and an air outlet disposed at opposite ends thereof in which are arranged truss members, a bottom support assembly in communication with said heating gases and comprising a pair of rectangular grid sections respectively underlying said heater sections and arranged to carry substantially all the weight of said heater sections, each of said grid sections including a plurality of load-bearing grid bars arranged to effect substantially independent support of each of said heater cells, a pair of fixed top frames respectively arranged around the perimeters of each of said heater sections, and an internal tension tie system for counteracting the pressure within said air flow passage and comprising first vertical ties interconnecting said top frames and said bottom support assembly, second horizontal ties passing between the tubes of said heater sections and being connected on the outsides of said casing, and third horizontal tie members connected between the truss members disposed within said air inlet and said outlet, said first, second and third tension ties being mutually perpendicular to each other.

11. A bottom supported air heater for heating air comprising means forming a single laterally extending air flow passage, a pair of heater sections in side-by-side relation, means forming a hopper underlying said heater sections, each of said heater sections comprising a plurality of heater cells, each heater cell including an upper and a parallel lower tube sheet, and a multiplicity of upright tubular members rigidly connected to and extending between said upper and lower tube sheets, each heater cell being bounded on at least two of its sides by other heater cells, said tubular members and said hopper being arranged to effect a U-shaped flow path of heating gases through said tubular members of said air heater in indirect heat exchange relation with said air, a horizontally disposed bottom support assembly within said hopper in communication with said heating gases and comprising a pair of rectangular grid sections respectively underlying said heater sections and arranged to carry substantially all the weight of said heater sections, each of said grid sections including a frame and a plurality of spaced load-bearing grid bars connected between opposite sides of said frame, said grid bars being arranged relative to said heater cells so that at least two of said grid bars underlie each of said heater cells on opposite sides of the center of gravity thereof to effect substantially independent support of each of said heater cells, each of said cells being supported by but free of rigid attachment to its respective grid bars, sealing means interconnecting the contiguous upper and lower tube sheets of adjacent heater cells, and means for accommodating horizontal expansion of said bottom support assembly in substantially radial directions from approximately the center thereof.

12. A bottom supported air heater for heating air comprising means forming a single laterally extending air flow passage, a pair of side-by-side upright heater sections arranged to effect a U-shaped flow path of heating gases through the air heater in heat exchange relation with said air, each of said heater sections comprising a plurality of upright heater cells, each heater cell including a rectangular upper tube sheet and a parallel lower tube sheet, and a multiplicity of tubular members rigidly connected to and extending between said upper and lower tube sheets, each heater cell being bounded on at least two of its sides by other heater cells, a bottom support assembly in communication with said heating gases and comprising a pair of rectangular grid sections respectively underlying said heater sections and arranged to carry substantially all the weight of said heater sections, each of said grid sections including a frame and a plurality of parallel spaced load-bearing grid bars connected between opposite sides of said frame, said grid bars being arranged relative to said heater cells so that at least two of said grid bars underlie each of said heater cells on opposite sides of the center of gravity thereof to effect substantially independent support of each of said heater cells, sealing means interconnecting the contiguous upper and lower tube sheets of adjacent heater cells, a pair of fixed top frames respectively arranged around the upper perimeters of each of said heater sections, first expansion means interconnecting the peripheral tube sheet edges of each of said heater sections to their respective top frames, for accommodating vertical expansion of said heater sections and second expansion means for accommodating horizontal expansion of said bottom support assembly in substantially radial directions from approximately the center thereof.

13. A bottom supported air heater comprising means forming a single laterally extending pressurized air flow passage, a pair of heater sections in side-by-side relation, means forming a hopper underlying said heater sections, each of said heater sections comprising a plurality of heater cells, each heater cell including an upper and a parallel lower tube sheet, and a multiplicity of upright tubular members rigidly connected to and extending between said upper and lower tube sheets, each heater cell being bounded on at least two of its sides by other heater cells, means for effecting a U-shaped flow path of heating gases through said tubular members in indirect heat exchange relation with said air and through said hopper, a horizontally disposed bottom support assembly within said hopper in communication with said heating gases and comprising a pair of rectangular grid sections respectively underlying said heater sections and arranged to carry substantially all the weight of said heater sections, each of said grid sections including a frame and a plurality of substantially parallel spaced load-bearing grid bars connected between opposite sides of said frame, said grid bars being arranged relative to said heater cells so that at least two of said grid bars underlie each of said heater cells on opposite sides of the center of gravity thereof to effect substantially independent support of each of said heater cells, sealing means interconnecting the contiguous upper and lower tube sheets of adjacent heater cells, an internal tension tie system including tensioned ties extending through said air heater in three directions mutually perpendicular to each other for counteracting the pressure within said air flow passage, a pair of fixed top frames respectively arranged around the upper perimeters of each of said heater sections, first expansion means interconnecting the peripheral tube sheet edges of each of said heater sections to their respective top frames for accommodating vertical expansion of said heater sections and second expansion means for accommodating horizontal expansion of said bottom support assembly in substantially radial directions from approximately the center thereof comprising a plurality of hinged support posts connected to said support assembly and disposed substantially along the lateral and transverse centerlines thereof, rigid structural members disposed adjacent the corners of said support assembly, and flexible members connecting said corners with said structural members.

References Cited by the Examiner
UNITED STATES PATENTS

| 2,393,707 | 1/1946 | Rehm | 122—510 X |
| 2,515,443 | 7/1950 | Ebbets | 122—510 |
| 2,580,715 | 1/1952 | Baber | 165—81 |
| 2,979,041 | 4/1961 | Young | 122—510 |

ROBERT A. O'LEARY, *Primary Examiner.*

CHARLES SUKALO, *Examiner.*

M. A. ANTONAKAS, *Assistant Examiner.*